United States Patent
Schmidlin et al.

[11] 3,951,519
[45] Apr. 20, 1976

[54] LIQUID CRYSTAL IMAGING SYSTEM

[75] Inventors: Fred W. Schmidlin, Pittsford; Werner E. Haas, Webster; James E. Adams, Ontario, all of N.Y.

[73] Assignee: Xerox Corporation, Stamford, Conn.

[22] Filed: Aug. 19, 1974

[21] Appl. No.: 498,835

[52] U.S. Cl. .............................. 350/160 LC; 350/150
[51] Int. Cl.² ............................................ G02F 1/13
[58] Field of Search ..................... 350/160 LC, 150

[56] References Cited
UNITED STATES PATENTS

| | | | |
|---|---|---|---|
| 3,671,231 | 6/1972 | Haas et al. | 350/160 LC UX |
| 3,687,515 | 8/1972 | Haas et al. | 350/160 LC X |

*Primary Examiner*—John K. Corbin
*Assistant Examiner*—Matthew W. Koren
*Attorney, Agent, or Firm*—James J. Ralabate; Michael H. Shanahan; George J. Cannon

[57] ABSTRACT

An imaging system wherein an imaging member comprises a layer of a homeotropically aligned nematic liquid crystalline material which is optically uniaxial residing on a photoconductive insulating layer. When the liquid crystal layer is subjected to an electrostatic charge and the photoconductive insulating layer is exposed to an imagewise pattern of activating electromagnetic radiation, the liquid crystalline material is subjected in selective areas to an electrical field which has components both in the plane of the layer and normal to the plane of the layer thereby inducing optical biaxiality in those areas of the imaging material. In a preferred embodiment of the invention a layer of a suitable overcoating material is arranged over the liquid crystal layer.

18 Claims, 5 Drawing Figures

LIQUID CRYSTAL IMAGING SYSTEM

BACKGROUND OF THE INVENTION

This invention relates generally to a liquid crystal imaging system and, more particularly, to an imaging system wherein a layer of a homeotropically aligned nematic liquid crystalline material is the active element of an imaging member.

The name "liquid crystals" has become generic to liquid crystalline materials which exhibit dual physical characteristics, some of which are typically associated with liquids and others which are typically unique to solids. Liquid crystals exhibit mechanical characteristics, such as viscosities, which are ordinarily associated with liquids. The optical scattering and transmission characteristics of liquid crystals are similar to those characteristics ordinarily unique to solids. In liquids or fluids, the molecules are typically randomly distributed and oriented throughout the mass of the substance. Conversely, in crystalline solids, the molecules and/or atoms are generally rigidly oriented and arranged in a specific crystalline structure. Liquid crystals resemble solid crystals in that the molecules of the liquid crystalline substances are regularly oriented in a fashion analogous to but less extensive than the molecular orientation and structure in a crystalline solid. Many substances have been found to exhibit liquid crystalline characteristics in a relatively narrow temperature range; but below such temperature ranges, the substances typically appear as crystalline solids and above such temperature ranges, they typically appear as liquids.

Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules are arranged in a manner which is unique to each of the three mesomorphic structures. Each of these three structures is well known in the liquid crystal art.

It is well known in the art that liquid crystalline materials can be used in imaging techniques which utilize their response to electrical fields. U.S. Pat. No. 3,687,515 to Haas et al discloses an electrooptic system wherein a layer of a nematic liquid crystalline composition which is optically uniaxial with the optic axis normal to the plane of the layer has an electrical field applied perpendicular to the optic axis of the composition layer thereby inducing optical biaxiality in the composition layer. This patent teaches an imaging system which exploits the optic retardation accompanying a field induced change from the uniaxial to the biaxial state. It is also disclosed therein that a layer of a nematic liquid crystalline material may be more readily made to adopt a homeotropically aligned texture state, i.e., wherein the major molecular axes of a substantial portion of the molecules are aligned substantially perpendicular to the plane of the layer, when deposited on a substrate by incorporating a surfactant additive material in the nematic liquid crystalline material. Other techniques for inducing the homeotropic texture state in layers of nematic liquid crystalline materials residing on substrates are also known in the art such as, for example, rubbing the surface of the substrate prior to depositing the nematogenic material thereupon or treating the surface with a material such as lecithin (see, for example, U.S. Pat. No. 3,597,150). For a detailed description of the nematic homeotropic texture see Gray, G. W. *Molecular Structure and the Properties of Liquid Crystals*, Academic Press, London, 1962.

There has also been disclosed in the art a device wherein a pair of transparent electrodes form a sandwich around a layer of homeotropically aligned nematic liquid crystalline material residing on a photoconductive insulating layer. It is disclosed that the effects caused by the application of electrical fields across the liquid crystal layer-photoconductive layer combination may be exploited, for example, to transform a black and white image into a color image. See Assouline et al, C.R. Acad. Sci., Paris, *t*. 274, 692 — Serie B (6 Mar. 1972).

The present invention relates to a novel and advantageous liquid crystal imaging system wherein the optic retardation accompanying an electrical field induced change from the uniaxial to the biaxial state in selective areas of a nematic liquid crystalline layer is exploited.

SUMMARY OF THE INVENTION

It is an object of the invention to provide a novel liquid crystal imaging system.

It is another object to provide a liquid crystal imaging system which utilizes an imaging member wherein the active element comprises a layer of a homeotropically aligned nematic liquid crystalline material residing on a photoconductive insulating layer.

It is a further object of the invention to provide an imaging system wherein the imaging member further includes a layer of an overcoating material disposed over said liquid crystal layer.

It is a still further object to selectively transform an optically uniaxial nematic liquid crystalline material to the optically biaxial state by means of an electrical field which has components both in the plane of the liquid crystal layer and normal to the plane of the layer.

It is still another object to selectively transform an optically uniaxial nematic liquid crystalline material to the optically biaxial state with the electrical fields generated by imagewise exposure of a uniformly electrically charged imaging member which includes a photoconductive insulating layer.

It is still another object to exploit the induced retardation which accompanies the change from the uniaxial to the biaxial state in imaging applications.

BRIEF SUMMARY OF THE INVENTION

The foregoing and other objects and advantages are accomplished in accordance with the present invention by providing an imaging member comprising a layer of a homeotropically aligned nematic liquid crystalline material residing on a photoconductive insulating layer, applying a uniform electrostatic charge to the liquid crystal layer and exposing the photoconductive insulating layer to an imagewise pattern of activating electromagnetic radiation. The liquid crystalline material is thereby subjected in selective areas to an electrical field which has components both in the plane of the layer and normal to the plane of the layer thus inducing optical biaxiality in those areas of the imaging material. In a preferred embodiment the imaging member further includes a conductive substrate and a layer of a suitable overcoating material arranged over the liquid crystal layer.

BRIEF DESCRIPTION OF THE DRAWINGS

For a better understanding of the invention as well as other objects and further features thereof, reference is made to the following detailed disclosure of various preferred embodiments of the invention, taken in conjunction with the accompanying drawings wherein.

DESCRIPTION OF THE PREFERRED EMBODIMENTS

Figure 1:
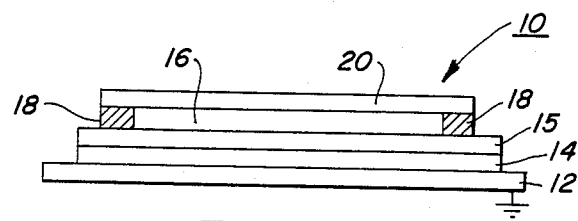
FIG. 1 is a partially schematic cross-sectional view of an imaging member according to the invention.

In FIG. 1 there is illustrated a liquid crystal imaging member, generally designated 10, wherein a xerographic plate comprises optional substrate 12 carrying a photoconductive insulating layer 14. Optional optical blocking layer 15 overlies layer 14. A layer of homeotropically aligned nematic liquid crystalline material 16 overlies layer 14 or layer 15 when the latter is present and is held in place by a gasket member 18. Optional substantially transparent overcoating layer 20 overlies liquid crystal layer 18.

Xerographic plates such as the type illustrated in FIG. 1 are well known to the electrophotographic imaging art and in the xerographic imaging art in particular. Optional substrate 12 is electrically conductive and may comprise any suitable material having the appropriate mechanical and electrical properties. The substrate, when present, is preferably grounded, as illustrated, to electrically connect all parts of that surface of the substrate. While it is preferred to have a substrate for the imaging member, it should be noted that it is not required where the photoconductive layer has the requisite mechanical integrity. Where the substrate is not present, or if present it is not grounded, then the uniform electrostatic charge applied to the imaging member according to the present method would have to be applied by the double sided corona charging technique as is known in the art.

Any typical suitable photoconductive insulating material may be used for layer 14. Typical suitable photoconductive insulating materials include, for example, selenium, poly-n-vinylcarbazole (PVK), poly-n-vinylcarbazole doped with sensitizers such as Brilliant green dye, phthalocyanine and 2,4,7-trinitro-9-fluorenone (TNF); cadmium sulfide, cadmium selenide; zinc oxide, sulfur, anthracene and tellurium. Additionally, photoconductive layer 14 may comprise a finely ground photoconductive insulating material dispersed in a high resistance electrical binder such as is disclosed in U.S. Pat. No. 3,121,006 to Middleton et al., or an inorganic photoconductive insulating material such as is disclosed in U.S. Pat. No. 3,121,007 to Middleton et al., or an organic photoconductor such as phthalocyanine in a binder. Generally, any photoconductive insulating material or composition may be used for layer 14.

The thickness of photoconductive layer 14 is typically in the range of from about 1 micron to about 500 microns and preferably from about 10 microns to about 100 microns. The photoconductive layer may be formed on substrate 12 by any of the many methods which are well known to those skilled in the art including, for example, vacuum evaporation, dip coating from a solution, etc.

Liquid crystal layer 16 comprises a homeotropically aligned nematic liquid crystalline material. The nematic liquid material may have positive or negative dielectric anisotropy at the operative conditions of the present method. The nematic liquid crystalline material may be caused to adopt the homeotropic alignment, i.e., where the major molecular axes of a substantial portion of the molecules are arranged substantially perpendicular to the plane of the layer, or any suitable technique. For example, it is known in the art that surface treatments applied to a substrate such as, for example, with materials such as lecithin will cause a film of a nematic liquid crystalline material deposited on the treated substrate to adopt the homeotropically aligned state. See, for example, U.S. Pat. No. 3,597,043. Hence, the liquid crystal contact surface of one or both of the layers immediately above or below layer 16 could be treated with a suitable surface treatment material and a film of any suitable nematic liquid crystalline sandwiched between these layers would typically adopt the homeotropically aligned state. It has also been taught in that art that the nematic liquid crystalline materials can be doped with additives which will cause the compositions to adopt the homeotropically aligned state when a thin film thereof is deposited on a substrate. Typical suitable aligning agents include materials such as surfactants, for example, polyamide resin surfactants, and various types of resins. An extensive list of typical aligning agents is found in U.S. Pat. No. 3,803,050. The homeotropically aligned state may also be brought about by very carefully cleaning the contact surfaces of the layers prior to forming the liquid crystalline layer between them. Many nematic liquid crystalline materials useful in layer 16 as well as surface treatment materials and additives which will promote the desired homeotropic alignment are known in the art and a broad variety of these materials are listed in the patents referenced above. Accordingly, any extensive discussion of materials is not required here. A preferred composition for use in imaging layer 16 comprises p-methoxybenzylidene-p'-n-butylaniline and from about 0.1 to about 10 percent by weight of Versamid 100 a polyamide resin surfactant available from General Mills, Inc. Liquid crystal layer 16 is typically from about 1 micron to about 100 microns in thickness and preferably is in the range of from about 5 microns to about 20 microns.

The optional gasket 18 which contains the liquid crystal layer 16 on the surface of the photoconductive insulating layer 14 is typically chemically inert, substantially electrically insulating and may be transparent in various embodiments. Materials suitable for use in such gaskets include cellulose acetate, cellulose triacetate, cellulose acetate butyrate, polyurethane, elastomers, polyethylene, polypropylene, polyesters, polystyrene, polycarbonates, polyvinylfluoride, polytetrafluoroethylene, mixtures thereof, and the like. The gasket, which also approximately defines the thickness of liquid crystal layer 16, is preferably between about 0.5 micron and 100 microns in thickness.

Optional overlayer 20 typically possesses the requisite physical and electrical properties which will allow the entire imaging member 10 to be imaged in accordance with the invention and cyclically reused in the desired charge-expose mode as will be discussed in detail hereinafter. It is preferred to include the overlayer in the imaging member to protect the liquid crystalline material from contaminants and further because the overlayer typically extends the useful life of the imaging member. In the practice of the present method an electrostatic latent image is typically formed on the free surface of overlayer 20 when the imaging member is subjected to the charge-expose mode and therefore overlayer 20 generally possesses the properties which will allow this desired result to occur. Generally, the resistivity of the overlayer is dependent upon the resistivity of the liquid crystalline material and typically should be in the range of the same order of magnitude as that of the liquid crystalline material. Overlayer 20 generally has a bulk resistivity of from about $10^9$ to about $10^{11}$ ohm-cm. Typical suitable materials for use in overlayer 20 include, for example, Tedlar, a polyvinylfluoride available from duPont, polyurethanes and polycarbonates. Overlayer 20 is typically a thin transparent film and generally has a thickness not greater than about 1 mil. A preferred thickness for this layer is about ¼ mil.

Figure 2A:
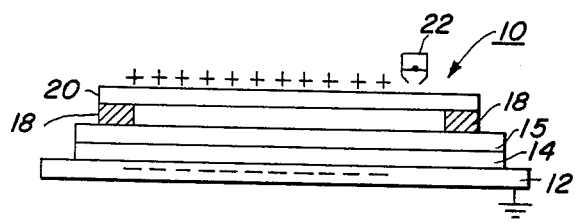
FIGS. 2A–2D illustrate the advantageous method steps of the present invention in partially schematic cross-sectional views.

FIGS. 2A–2D illustrate the steps of the advantageous imaging method in partially schematic cross-sectional views. In FIG. 2A the imaging member 10 is illustrated being electrically charged by a corona charging device 22. The electrical charging of the imaging member is typically enhanced by grounding the substrate 12 as illustrated. Alternatively, a double sided corona charging technique may be used wherein one corona charging device is arranged on each side of the imaging member and the respective sides of the imaging member are charged to opposite polarities and/or opposite potentials in embodiments wherein the substrate is not grounded or is not present. In this way the imaging member is uniformly electrically charged as illustrated. Of course, though the imaging member is shown being positively charged it should be understood that either positive or negative charges may be placed upon the imaging member depending, inter alia, upon the type of photoconductive insulating material which comprises layer 14 and the imaging method performs equally satisfactorily when charged to either polarity. Imaging member 10 is typically electrically charged to surface potentials in the range of from about 100 to about 1000 volts. It is noted that initially the electrical field established across liquid crystal layer 16 is uniform and normal to the plane of the layer.

Figure 2B:
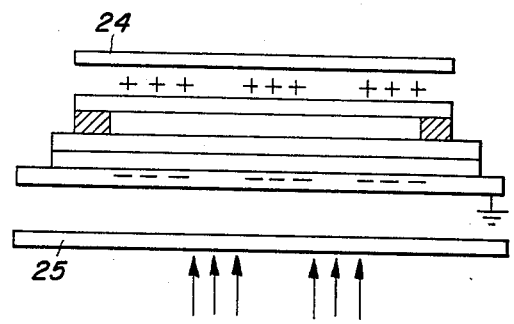
Figure 2C:
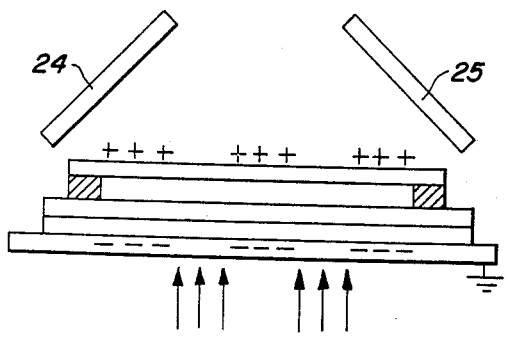

In FIG. 2B the substantially uniformly electrically charged imaging member 10 is shown being exposed to an imagewise pattern of activating electromagnetic radiation (represented by the arrows) typically forming an electrostatic latent image on the surface of overlayer 20. Of course, exposure may be effected from the other side of the imaging member 10 where it is so desired. The illumination striking the photoconductor causes migration of charge and a redistribution of the electrical field everywhere. After the exposure step the electrical field across the liquid crystal layer at the boundaries between the areas corresponding to light struck portions of the photoconductor and those corresponding to portions of the photoconductor which did not receive any radiation generally now has components both in the plane of the liquid crystal layer and normal to the plane of the layer. Accordingly, at these boundaries the liquid crystalline material which is initially in the homeotropically aligned state and optically uniaxial is subjected to an electrical field having components both parallel to and normal to the plane of the layer whereas the remaining portions of the liquid crystalline material continue to be subjected to an electrical field which is normal to the plane of the layer. In this manner optical biaxiality is induced in the liquid crystalline material at those areas of the layer where the above-described boundaries exist. The resultant biaxiality induced at selective areas of liquid crystal layer 16 may be viewed either in transmission or reflection, preferably through image enhancing means such as a linear polarizer and a linear analyzer which are preferably crossed. In FIG. 2B there is illustrated transmissive readout wherein linear polarizer 24 and linear analyzer 25 are arranged on opposite sides of imaging member 10. FIG. 2C illustrates the reflective readout mode where the crossed linear polarizer 24 and linear analyzer 25 are on the same side of the member. The image may be read out with ambient light or a separate readout light source (not shown) may be provided.

The dependence of birefringence on electrical field is extraordinarily large and therefore relatively small electrical fields of the order of about 100 volts/cm may be detected thus providing a highly sensitive imaging technique. It should be noted that the imaging method generally has an "edge-only" characteristic, that is, it will ordinarily reproduce line copy original images such as the characters on this page. Of course, this is satisfactory in many instances since a great deal of the material sought to be reproduced comprises line copy image information. However, where the original image information includes relatively broad solid image areas these would not be satisfactorily reproduced because of the edge-only characteristic of the imaging method. Hence, according to the present method, where it is desired to reproduce an original image which includes broad solid areas the image information is spatially modulated before striking the photoconductor such as by passing it through an absorption type line grating comprising alternating strips, generally equal in width, of light absorbing or reflecting, and light transmitting areas. In this manner, satisfactory reproduction of these types of images is obtained according to the invention.

In the configurations illustrated in FIGS. 2A–2D where the imaging member is illuminated from one side and viewed from the opposite side an optical blocking layer is typically included in the imaging member where the readout illumination is actinic to the photoconductive layer. The optical blocking layer 15 serves to reflect the readout illumination and to prevent the readout illumination from discharging the photoconductor where the photoconductive material is actinic to the readout illumination. The optical blocking layer 15 is typically from about 500A to about 5000A thick and must be sufficiently electrically insulating to prevent shorting the image, typically having a bulk resistivity above about $10^{11}$ ohm-cm. Any reflective optical blocking layer of appropriate conductivity such as a dielectric mirror in combination with a layer of cadmium telluride may be used. It should be noted that optical blocking layer 15 is not required where the photoconductive insulating layer 14 is not actinic to the readout illumination. However, where layer 15 is not included in the imaging member, a light reflecting surface must be present to reflect the incident readout light when the reflection readout mode is utilized. The reflecting surface may be provided by the photoconductive layer since there are known many photoconductive materials which have a smooth surface when deposited on a flat surface thus giving them relatively high reflectance properties, e.g., from 10 to 50 percent. It should be noted that the imaging member may be exposed and viewed from the same side when the viewing illumination does not affect the photoconductor.

In a particularly preferred embodiment of the present invention, the imaging member is exposed to an imagewise X-ray pattern such as is obtained when an object such as a person is exposed to X-ray radiation in the well known mode. Because of the great sensitivity of the induced biaxiality use of the present method to detect X-ray patterns may permit a lower exposure dosage in xeroradiography for the same information content or provide more information for a fixed exposure level. Selenium is a suitable photoconductive material for use in layer 14 in this embodiment.

The induced biaxiality is present in the liquid crystal layer only within some relaxation time when the electrostatic latent image is present and accordingly it is preferred to view the image during exposure or to provide a hard copy reproduction of the image such as by recording the image on conventional photographic film, etc.

Figure 2D:
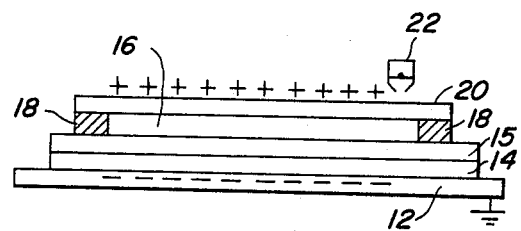

The imaged member may be more quickly erased by substantially uniformly electrically charging the surface of overcoating layer 10 as illustrated in FIG. 2D wherein the erasure is shown being carried out by corona charging device 22. This erasure technique is preferred since the imaging member 10 is prepared for immediate reimaging at the same time that the visible image previously formed is destroyed. Alternatively, the photoconductive layer 14 may be uniformly exposed to activating radiation while the member is being subjected to electrical charging.

Although the invention has been described in detail with respect to various preferred embodiments thereof it will be appreciated that it is not intended to be limited thereto but rather that variations and modifications will be apparent to those skilled in the art upon a reading of the disclosure and these are intended to be within the spirit of the invention and the scope of the claims.

What is claimed is:

1. An imaging method comprising
    providing an imaging member comprising a layer of a homeotropically aligned nematic liquid crystalline material overlying a photoconductive insulating layer;
    electrically charging the surface of said imaging member without applying any other voltage across the imaging member; and
    exposing said photoconductive insulating layer to an imagewise pattern of activating radiation wherein optical biaxiality is induced in said layer of nematic liquid crystalline material only at boundaries between exposed and non-exposed regions of the photoconductive layer.

2. The method as defined in claim 1 wherein said imaging member further includes a conductive substrate.

3. The method as defined in claim 2 and further including the step of erasing said image.

4. The method as defined in claim 3 wherein said step of erasing comprises electrically charging the surface of said imaging member.

5. The method as defined in claim 2 wherein said image is viewed in transmission between a linear polarizer and a linear analyzer.

6. The method as defined in claim 2 wherein said image is viewed in reflection with illumination which is passed through a linear polarizer and a linear analyzer.

7. The method as defined in claim 2 wherein said conductive substrate is substantially transparent.

8. The method as defined in claim 2 wherein said imaging member further includes a substantially transparent overcoating layer over said liquid crystal layer.

9. The method as defined in claim 8 wherein said overcoating layer has a bulk resistivity of from about $10^9$ to about $10^{11}$ ohm-cm, and a thickness not greater than about 1 mil.

10. The method as defined in claim 9 wherein said overcoating layer has a thickness of about ¼ mil.

11. The method as defined in claim 2 wherein said imaging member further includes an optical blocking layer arranged between said photoconductive insulating layer and said liquid crystal layer.

12. The method as defined in claim 2 and further including the step of spatially modulating said imagewise pattern of activating electromagnetic radiation.

13. The method as defined in claim 2 wherein said liquid crystal layer has a thickness in the range of from about 1 micron to about 100 microns.

14. The method as defined in claim 13 wherein said liquid crystal layer has a thickness in the range of from about 5 microns to about 20 microns.

15. The method as defined in claim 2 wherein said photoconductive insulating layer has a thickness in the range of from about 10 microns to about 100 microns.

16. The method as defined in claim 2 wherein said homeotropically aligned nematic liquid crystalline material comprises nematic liquid crystalline material having dispersed throughout an aligning agent.

17. The method as defined in claim 2 wherein said imagewise pattern of electromagnetic radiation comprises an X-ray pattern.

18. The method as defined in claim 2 wherein said conductive substrate is substantially transparent and wherein said imaging member further includes an optical blocking layer arranged between said photoconductive insulating layer and said liquid crystal layer and a substantially transparent overcoating layer having a bulk resistivity of from about $10^9$ to about $10^{11}$ ohm-cm, and a thickness not greater than about 1 mil over said liquid crystal layer.

* * * * *